June 15, 1948. C. C. STUART 2,443,523
DUNNAGE FOR AIRPLANE PARTS
Filed Aug. 9, 1944 6 Sheets-Sheet 1
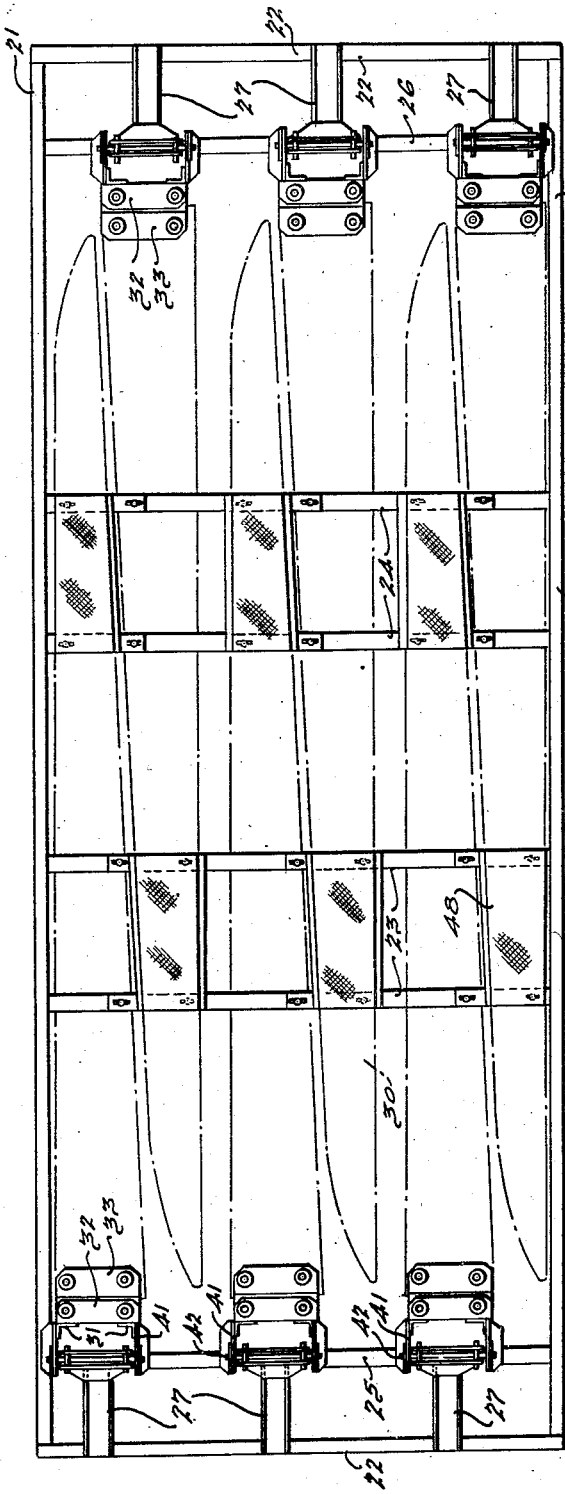
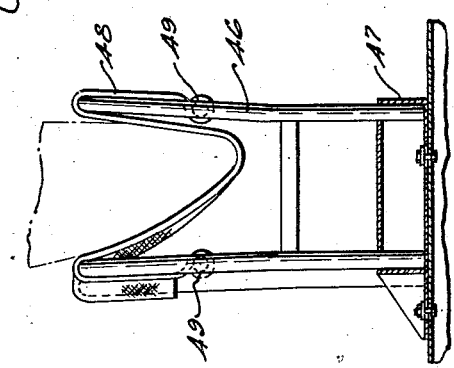
INVENTOR.
Clarence C. Stuart
BY
Joseph Darley
ATTORNEY.

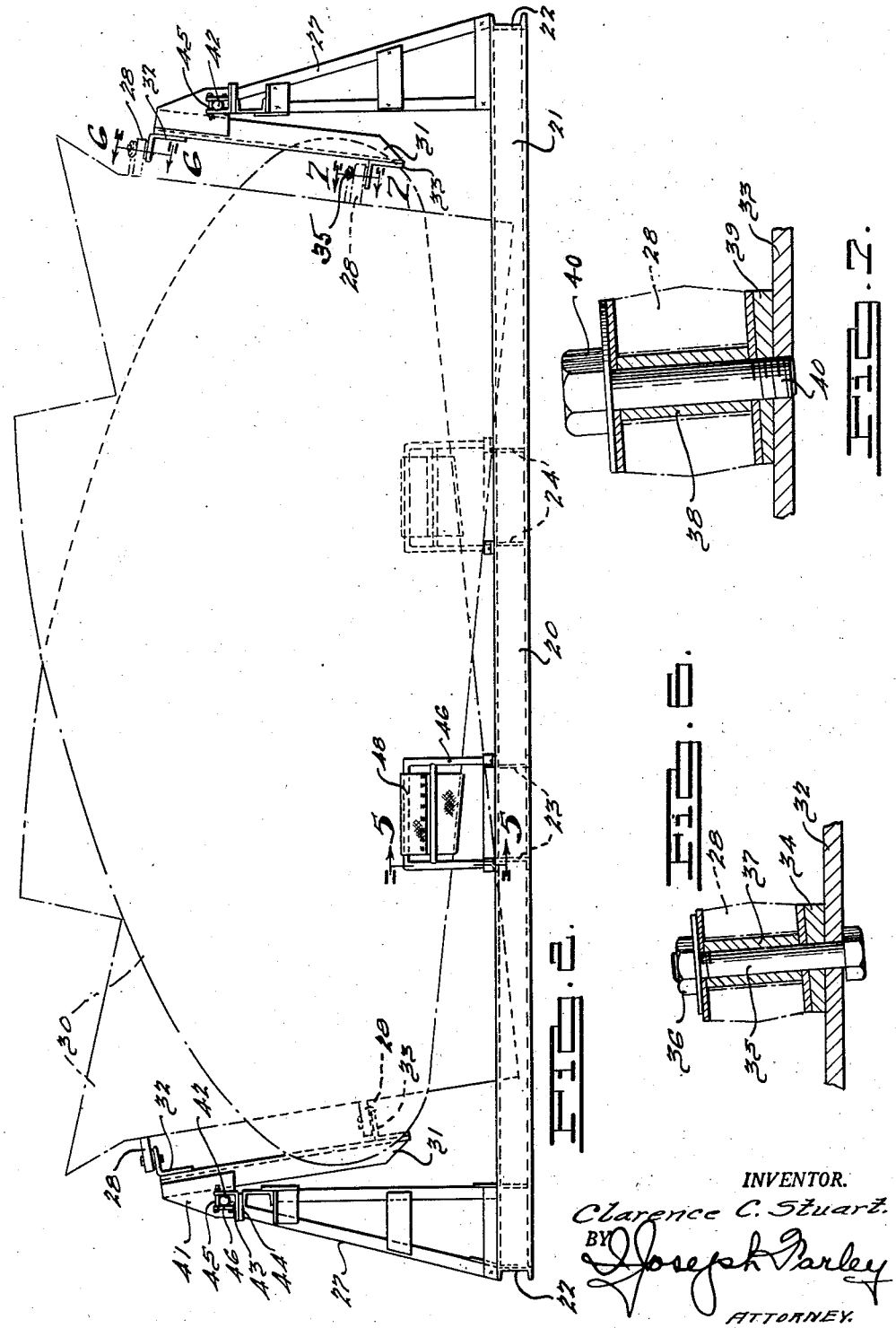

June 15, 1948.     C. C. STUART     2,443,523
DUNNAGE FOR AIRPLANE PARTS
Filed Aug. 9, 1944     6 Sheets-Sheet 3
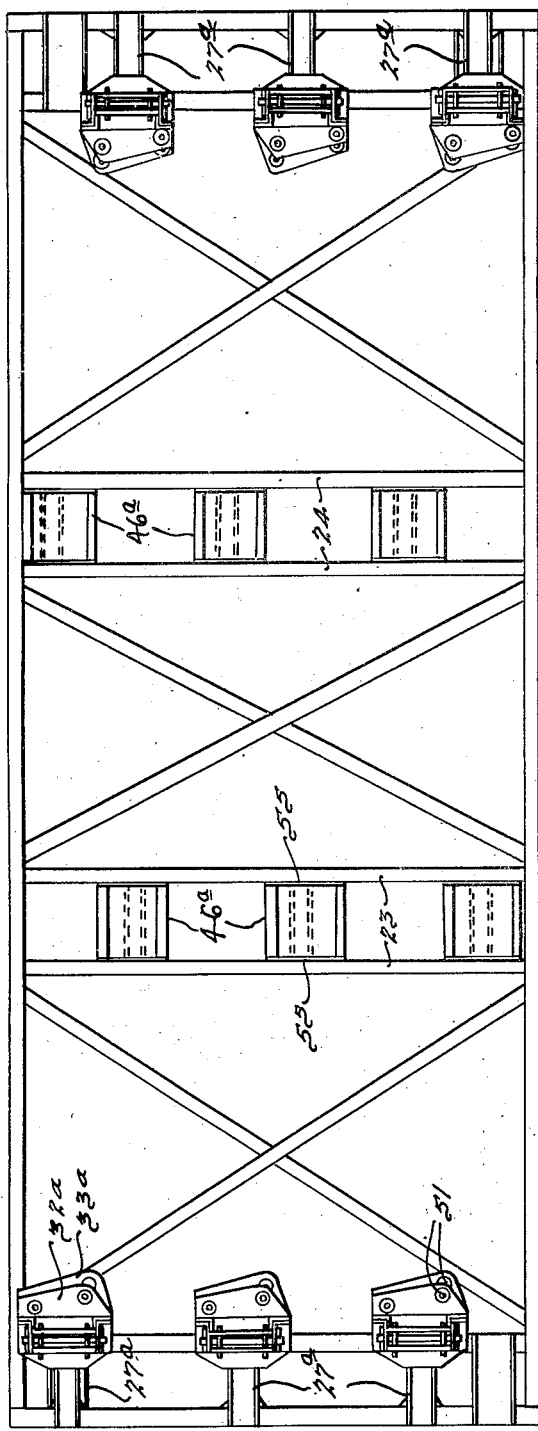
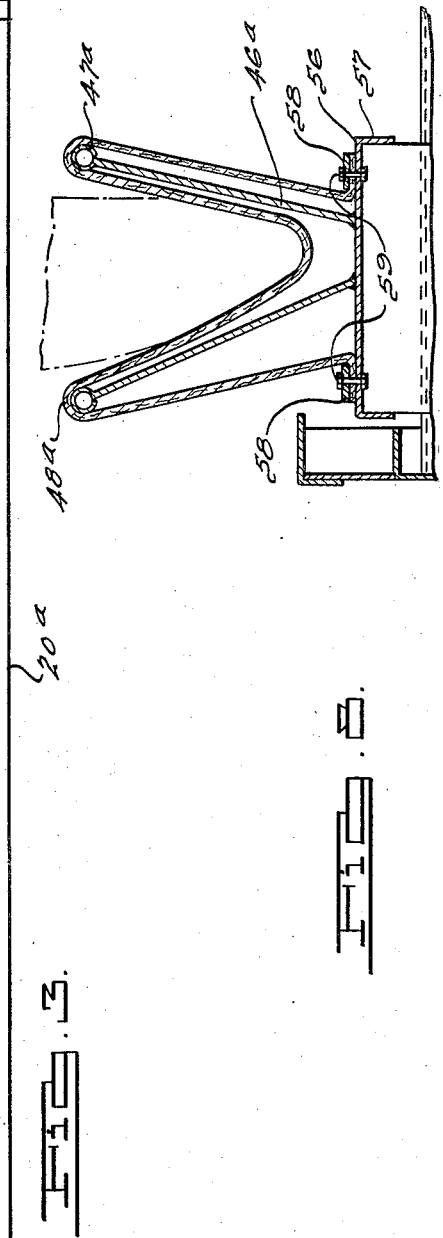
INVENTOR.
Clarence C. Stuart
BY Joseph Darley
ATTORNEY.

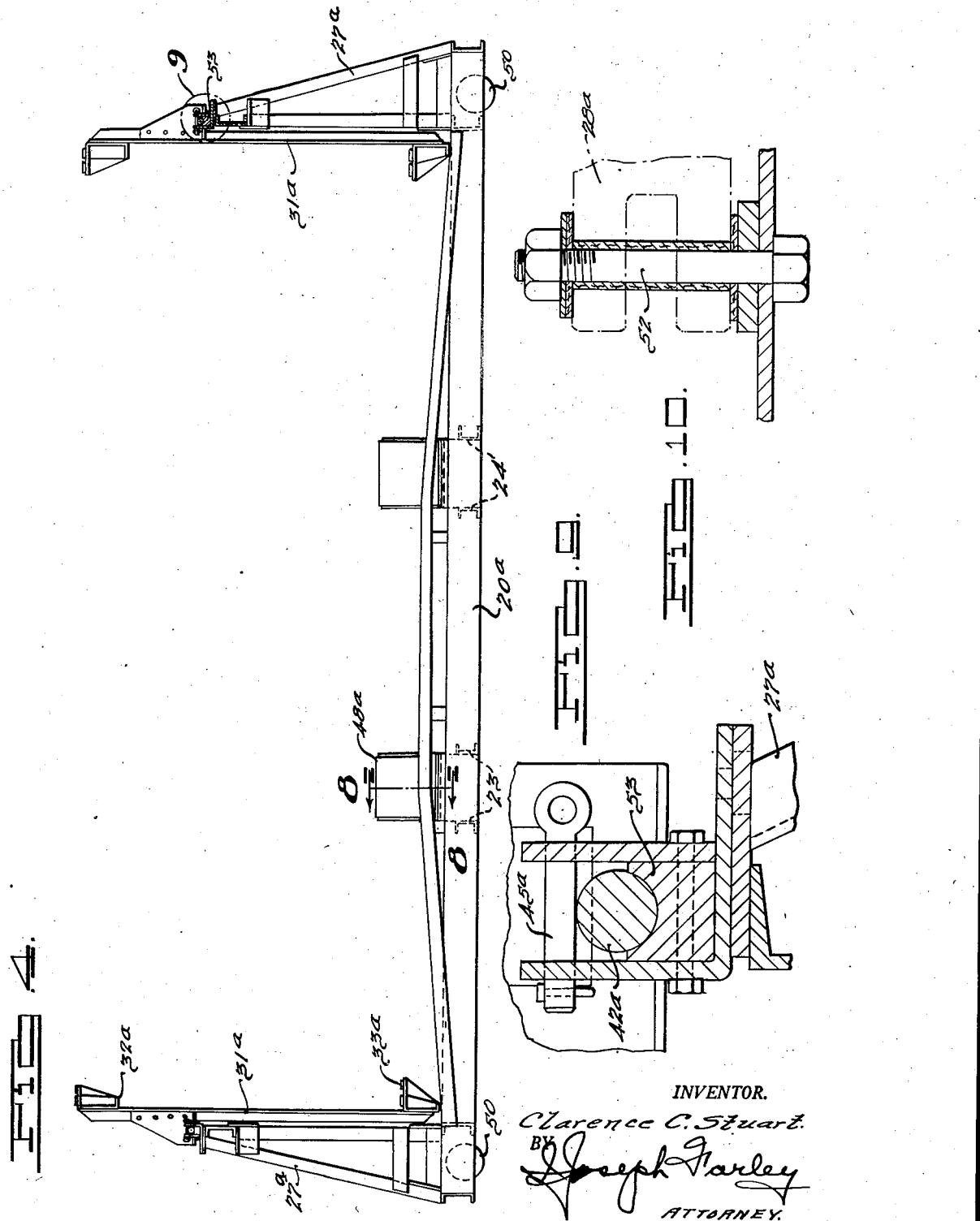

June 15, 1948.  C. C. STUART  2,443,523
DUNNAGE FOR AIRPLANE PARTS
Filed Aug. 9, 1944  6 Sheets-Sheet 5
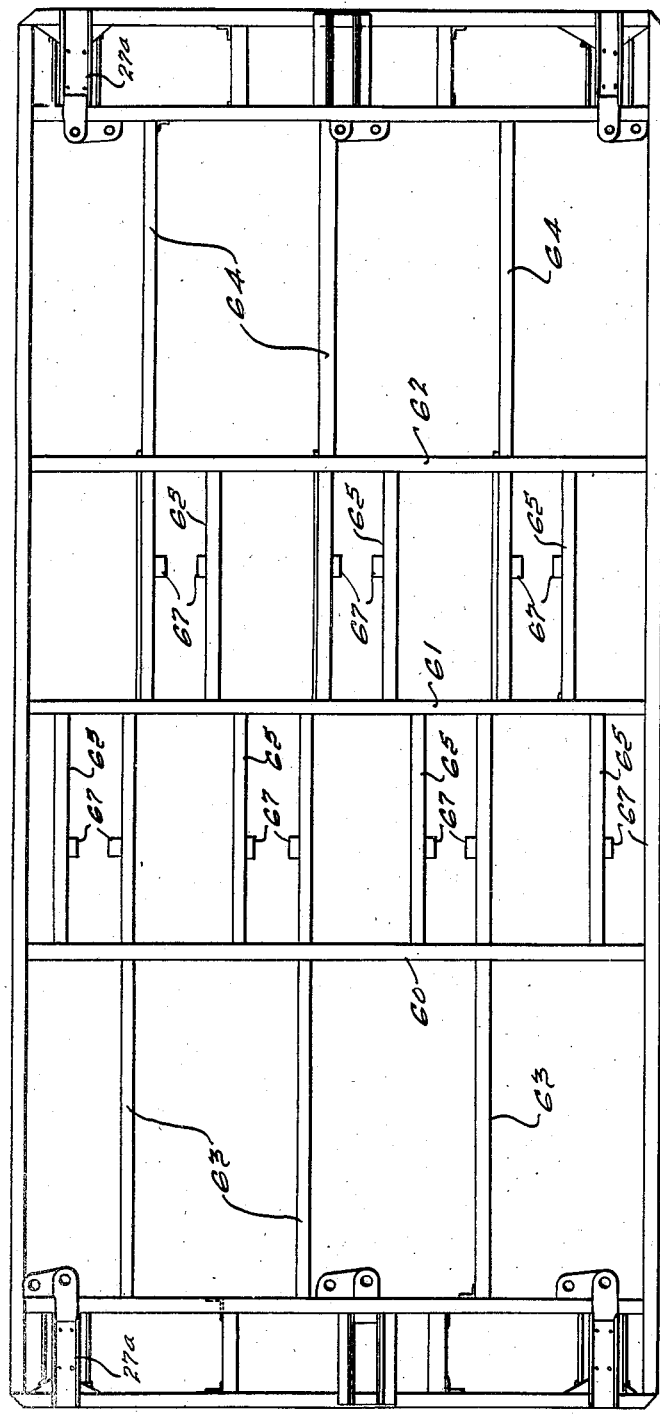
INVENTOR.
Clarence C. Stuart.
BY Joseph Farley
ATTORNEY.

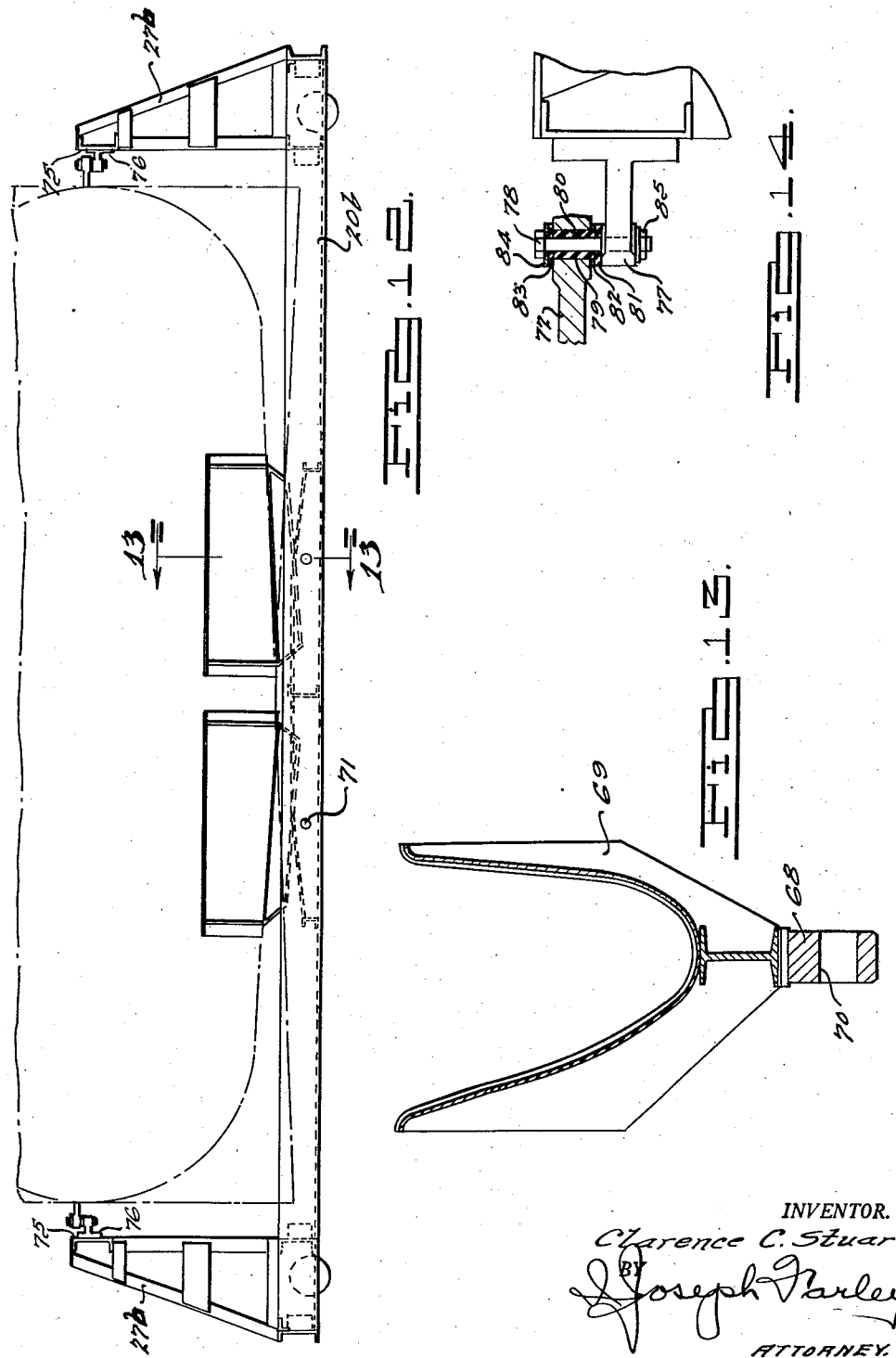

Patented June 15, 1948

2,443,523

UNITED STATES PATENT OFFICE 2,443,523

DUNNAGE FOR AIRPLANE PARTS

Clarence C. Stuart, Pontiac, Mich., assignor to Mechanical Handling Systems, Inc., Detroit, Mich., a corporation of Michigan Application August 9, 1944, Serial No. 548,767

12 Claims. (Cl. 211—13)

This invention relates to dunnage for the transportation of airplane parts, and particularly for the transportation of wing panels.

In order to meet the extremely heavy demands for the production of airplanes because of World War conditions, the practice was established of having many airplane parts fabricated in widely scattered plants which shipped the parts to main assembly plants for incorporation into the completed planes. Among the parts that have been extremely sub-contracted are wing sections, or panels, as well as fuselage parts. These parts, as is well known, consist of a very thin outer skin constructed of a plurality of sheets of aluminum riveted together and suitably secured to an inner supporting frame or trusswork. The airplane wing panels are very large and bulky, yet are very fragile so that it is extremely difficult to handle and transport them without straining and buckling the outer skin and loosening the riveted joints thereof. Consequently, many man-hours of labor have been lost because of damage to airplane wing panels in transporting the same from the sub-assembly plants to the main assembly plants.

The present invention has for its principal object to provide a new and improved construction of dunnage means for suitably securing airplane wing panels in such a way as to obviate any damage to the parts during transportation.

Another object is to provide a new and improved construction for such dunnage means that will enable a plurality of wing parts to be carried in any suitable conveyance such, for example, as a truck trailer and so that the wing panels may be nested upon the trailer to permit a plurality of panels to be safely and expeditiously handled and transported.

A further object is to provide new and improved resilient supporting means for the wing panels so that restricted relative movement between the wing panels and carrying vehicle may occur whereby the unavoidable weaving effects to which the vehicle is subjected will not be transmitted to the parts being carried thereby.

Another object is to provide a new and improved dunnage frame mounted upon small wheels or casters having a plurality of suitable brackets thereon upon which the wing panels may be secured or packed and after the packing thereof in the shop where ample handling facilities, such as cranes or the like, are available, the wheeled frame having the panels thereon may be readily wheeled onto the carrying vehicle, whether the vehicle be a truck, trailer or a railway car.

A further object is to provide a new and improved construction of dunnage brackets for airplane wing panels that will enable a plurality of wing panels to be mounted and carried upon a suitable supporting frame.

The above and other objects of the present invention will appear more fully from the following more detailed description and by reference to the accompanying drawings forming a part hereof and wherein:

Fig. 1 is a plan view of a wheeled dunnage frame constructed in accordance with the principles of the present invention and showing a plurality of wing panels mounted thereon;

Fig. 2 is a side elevation of the structure shown in Fig. 1;

Fig. 3 is a view similar to Fig. 1 of a slightly modified form of frame but without the wing panels mounted thereon;

Fig. 4 is a side elevation of the frame shown in Fig. 3;

Fig. 5 is a section taken substantially on the line 5—5 of Fig. 2;

Figs. 6 and 7 are sectional details taken substantially on the lines 6—6 and 7—7 of Fig. 2;

Fig. 8 is a section taken on the line 8—8 of Fig. 4;

Fig. 9 is an enlarged sectional detail of the structure contained within the circle 9 of Fig. 4;

Fig. 10 is a sectional detail showing the manner in which an airplane wing panel is secured to a supporting bracket.

Fig. 11 is a side elevation of a slightly modified type of construction;

Fig. 12 is a cross-sectional view taken on the line 12—12 of Fig. 11;

Fig. 13 is an enlarged transverse sectional view taken on the line 13—13 of Fig. 12, and Fig. 14 is an enlarged detail of the means for securing a wing panel to a carrying bracket.

As shown in the drawings, the invention contemplates the use of a carrying frame indicated generally by the reference character 20 which is in the form of an open rectangular framework preferably constructed of suitable structural iron members such as channel irons or angle irons. The carrying frame consists of longitudinally extending side members 21, end members 22 and two pairs of intermediate cross braces 23, 24 and additional cross braces 25, 26 located adjacent to, but spaced from, the end members 22. A plurality of supporting brackets 27 are suitably secured at their lower ends upon the end members 22 and the cross braces 25, 26. These brackets are of generally triangular shape and are constructed of a plurality of small angle irons suitably braced to form a rigid structure.

As shown in Fig. 1, three brackets 27 are mounted at each end of the carrying frame 20 and are arranged in offset relation to the brackets at the other end of the frame so that the wing panels to be supported by the brackets may be arranged in overlapping nested arrangement upon the carrying frame. All airplane wing panels have permanently incorporated in their construction, means for securing the wing panel to the main wing structure of the plane. The wing panels shown in Fig. 2 of the drawing are provided with a pair of attachment lugs 28, 28 suitably apertured for the reception of bolts by means of which the panel 30 is securely clamped to the main wing structure. As the constructional details of the airplane wing panels or wing tips, as they are sometimes called, differ in accordance with the differences in construction of different models and makes of airplanes, the present invention includes different fixtures adapted to be secured to the different attachment lugs of the specifically different wing panels.

The particular type of fixture shown in Figs. 1 and 2 of the drawing for the wing panel illustrated therein consists of a pair of laterally spaced angle irons 31 to which are secured at the top and bottom ends thereof transverse angles 32 and 33. As the attachment lugs 28, 28 of the wing panels 30 are inclined relatively to a plane passing through the center of the wing panel and extending longitudinally thereof, the angle irons 32, 33 are provided with wedge-shaped pads 34, 39 upon which the lower inclined faces of the attachment lugs are adapted to rest. The legs of the angle irons 32 upon which the pads 34, 39 rest, as well as the pads, are provided with a through hole for the reception of a clamping bolt 35 having a nut 36, all as shown in Fig. 6 of the drawing; the bolt 35 passing through a suitable hollow sleeve or bushing 37 which forms a part of the attachment lug 28 of the wing panel.

As shown in Fig. 7, the lower attachment lug 28 of the wing panel is likewise provided with a suitable sleeve or bushing 38 but of larger diameter than the one provided in the attachment lug 28. The wedge-shaped pad 39 and the leg of the angle iron 33 upon which the pad 39 rests are each provided with a screw-threaded hole into which the screw-threaded end of the bolt 40 is adapted to be screwed to clamp the attachment lug 28 securely to the attachment fixture. The attachment fixture 31 also includes a pair of rearwardly extending side plates 41 securely attached to the rearwardly extending legs of the angle irons 31 and said side plates are apertured at their lower ends for the reception of a retaining bolt or bar 42, the central part of which is rotatably supported in a V-block 43 carried by a supporting plate 44 mounted on the upper end of each bracket 27. Any suitable readily removable means such as slip bolts or pins 45 pass through holes provided at the upper end of the vertically extending legs 46 of angle irons secured to the plate 44 and serve to retain the bolts 42 against accidental displacement.

Each of the cross braces 23 and 24 are provided with a plurality (three in the particular constructional example illustrated) of sling-supporting brackets 46, which may be of any suitable construction but which, as shown in Fig. 5, consist of a pair of lengths of pipe bent into U-form, the lower ends of which are secured, as by welding, or in any other suitable way, to the base 47 of the bracket 46. A sling 48, preferably constructed of a #8 Army duck three ply and felt-padded, has its ends formed into loops through which the pipe sections 49 are adapted to pass to hold the sling in position for engaging and supporting the wing panel adjacent the end thereof removed from its respective bracket 27.

In the form of the invention shown in Figs. 3 and 4, the frame 20—a is of the same general construction as the frame 20 and consists of an open rectangular framework supported on small caster wheels 50. Brackets 27—a similar in construction to the ones mounted upon the frame 20 shown in Figs. 1 and 2, are carried by said frame 20—a. The attachment fixtures 31—a shown in Figs. 3 and 4 differ slightly in constructional detail from the brackets 31 in that the members 32—a and 33—a provided at the respective upper and lower ends of the attachment fixtures 31—a are in the form of channel irons, the horizontal legs of which are provided with aligned apertures 51 for the reception of bolts 52 which pass through holes provided in the attachment lugs forming part of the structure of the wing panels 28—a to be carried. The brackets 27—a are also provided with a cut-out bearing block 53 in which rests the retaining bar or shaft 42—a and which serves to connect the attachment fixture 31—a rotatably to the bracket 27—a, slip bolts or pins 45—a being provided to hold the shaft 42—a against accidental displacement.

Adjacent to the central part of the frame 20—a, sling brackets are provided, each consisting of a pair of side plate members 46—a connected at their ends by plates 55; plates 46—a being secured along their bottom edges as by welding to a channel section member 56, the downwardly extending legs 57 of such channel sections being engaged in neat telescoping engagement with the cross braces 23 and 24 of the main frame. At their upper ends the plate sections 46—a are curved or bent to provide a tubular bead 47—a over which is adapted to be trained the sheet of heavy felt which forms the sling 48—a, the ends of the felt being brought down under retaining plates 58 adapted to be securely clamped to the channel member 56 by the bolts 59.

In the form of the invention shown in Figs. 11 to 14 inclusive, the frame 20—b is again somewhat similar in construction to the frames 20 and 20—a. In the form shown in Figs. 11 to 14, however, the frame 20—b is provided in the central part thereof with a plurality of cross braces 60, 61 and 62 and a plurality of longitudinally extending members 63, 64. Each of the longitudinal members 63 and 64 terminates at the central part of the frame and is suitably secured to the central cross brace 61. Extending between the cross braces 60, 61 and in spaced relationship to the braces 63 and 64 is a number of pieces 65. Each of the pieces 65 and its corresponding longitudinal brace 63 or 64 is provided with bearing bosses 67, between the opposed faces of which is adapted to be received a depending lug 68 secured to the lower central portion of a saddle 69. The lug 68 is apertured, as indicated at 70, for a pivot shaft 71 which passes through the bearing bosses 67 and the hole 70 to secure the saddle 69 pivotally to the supporting frame.

In the form shown in Figs. 11 to 14 the frame 20—b is also provided with brackets 27—b similar to those shown in the figures previously described. In view of the fact that the wing panels are pivotally supported by the frame 20—b by the pivotally mounted saddles 69, the connection of the ends of the panels to the brackets 27—b is a resilient instead of a pivotal connection. As shown best in Fig. 12, each bracket 27—b is provided at its upper end with a channel member 75 to the vertically-extending face or web of which is secured a plurality of brackets 76, each of which is provided with apertured spaced bosses 77 for the reception of a fastening bolt 78.

As shown best in the enlarged detail of Fig. 14, a soft rubber bushing 79 is mounted within the hole 80 provided in the attachment lug 72 of the wing panel 30—a. A soft rubber washer 81 is placed upon the upper face of the bracket lug 77 and a standard steel washer 82 is interposed between said rubber washer and the lower face of the attachment lug 72. A similar rubber washer 83 and standard washer 84 are placed upon the upper face of the attachment lug and the washer 84 is adapted to be engaged by the head of the bolt 78, the bolt, as shown, passing through the rubber bushing 80, the lug 77 of the attachment bracket and the assembly of washers, all of which are clamped snugly by means of the nut 85.

As will be seen from the foregoing, in each form of the invention as shown in the accompanying drawings a pair of spaced supports are provided for each of the wing panels to be carried, which pair of supports consist of the upright standard 27 having an attachment fixture secured thereto for engagement with the attachment lugs forming a part of the wing panel construction and by means of which the wing panel is secured in proper position upon the airplane. In each of the forms shown, the other of said pair of supports consist of a saddle or slink-like member which engages with the edge of the wing panel at a point spaced at considerable distance from the standard 27 and supports the wing panel in an upright vertical position as clearly shown in the drawings.

In the forms of the invention shown in Figs. 1 to 10, the wing panels are supported at one end by the attachment fixtures 31 which are pivotally and detachably secured to the standards 27 for pivotal movement upon the horizontal axis of the shaft 42. The other support for the panels is furnished by the slings or saddles constructed of felt or other suitable yieldable textile material which permits limited movement of the wing panel both laterally and longitudinally of the supporting frame construction.

In Figs. 11 to 14, the principle of providing a supporting member or fixture having a pivotal connection to the frame upon a horizontal axis is also employed, together with a second support upon which the wing panel is supported with limited yielding lateral and longitudinal movement; the pivotal support in Figs. 12 and 13 being effected through the saddles 69, each of which is adapted to pivot about the horizontal axis of the laterally extending shaft 71 while the limited yielding connection of the wing panel to the frame in this case is effected through the rubber bushing and washer connection to the standards 27—b.

The manner in which the devices shown in the drawing are used, as will be readily understood, is as follows: The wheeled frames or truck members 20 are preferably loaded in the shop or plant where handling apparatus, such as hoists or cranes, are available. Depending upon the type of wing panel construction which has been fabricated in such plant, suitable attachment fixtures 31 are provided. These attachment fixtures are clamped to the attachment lugs on the wing panel. The wing panels with the attachment lugs secured thereto are then lowered in proper position upon the frame or truck 20 until the lower edge of a wing panel engages within and rests upon the saddle or sling. The transverse shaft 42, suitably supported in the side plates 41, is then brought to rest within the bearing blocks 43 and the slip bolts or pins 45 placed in position to hold the shaft 42 against vertical displacement.

As clearly shown in the drawings, the trucks or wheeled frames are each provided with a plurality of uprights or standards and slings so that a plurality of wing panels may be mounted upon a single truck in overlapping nested relationship. After the frame has been loaded with its full number of wing panels it may then be wheeled onto a truck, trailer or railway car for shipping the panels to their destination.

While I have shown several modifications of the invention which have proven highly successful in actual use, it will, of course, be understood that the constructional details of the supporting frames, the manner of cross bracing the same and the specific constructional details of the attachment fixtures and the standards 27 may obviously be varied considerably without departing from the spirit of the invention as set forth in the claims hereunto appended.

I claim:

1. A rack of the type described comprising a supporting framework, a plurality of upright standards mounted on each end of said framework in laterally spaced relationship and a plurality of yieldable supporting slings or saddles mounted on said framework, one for each of said standards, arranged respectively in longitudinal alignment with said saddles and spaced longitudinally therefrom, a plurality of attachment fixtures, one for each of said standards, each of said attachment fixtures having means for securing the same to a part to be carried and means for pivotally connecting said attachment fixture to one of said standards for movement upon a horizontal axis extending laterally with respect to said frame.

2. A rack of the type set forth comprising a frame, a plurality of pairs of supporting members carried by said frame, each of said pairs of members consisting of an upright standard located at one end of said frame and a supporting saddle located intermediate the ends of said frame and spaced in longitudinal alignment with its corresponding standard, one of said members having means for pivotally securing the same upon a horizontal axis extending transversely to said frame and yielding means interposed between the other of said members and the part to be carried, whereby said part may have limited yielding movement with respect to said frame during transportation.

3. A rack of the type described comprising a supporting framework, a plurality of upright standards mounted on each end of said framework in laterally spaced relationship and a plurality of yieldable supporting slings or saddles mounted on said framework, one for each of said standards, arranged respectively in longitudinal alignment with said standards and spaced longitudinally therefrom, a plurality of attachment fixtures, one for each of said standards, each of said attachment fixtures having means for securing the same to a part to be carried, and means for pivotally connecting said attachment fixture to one of said standards for movement upon a horizontal axis extending laterally with respect to said frame and comprising a horizontal and laterally extending shaft carried by said attachment fixture and an upwardly open bearing carried by said standard in which said shaft is adapted to be supported.

4. A rack of the type described comprising a supporting framework, a plurality of upright standards mounted on each end of said framework in laterally spaced relationship, a plurality of yieldable supporting slings or saddles mounted on said framework, one for each of said standards, arranged respectively in longitudinal alignment with said saddles and spaced longitudinally therefrom, a plurality of attachment fixtures, one for each of said standards, each of said attachment fixtures having means for securing the same to a part to be carried, and means for pivotally connecting said attachment fixture to one of said standards for movement upon a horizontal axis extending laterally with respect to said frame and comprising a horizontal and laterally extending shaft carried by said attachment fixture and an upwardly open bearing carried by said standard in which said shaft is supported and readily detachable means carried by said standard for preventing accidental displacement of said shaft from said bearing during transportation.

5. A rack for transporting airplane parts comprising a frame, a plurality of standards secured in groups adjacent each end of said frame, the standards of each group being arranged in laterally spaced relationship with respect to each other and in offset staggered relation to the standards of the other group located at the opposite end of said frame, a plurality of supporting saddles mounted on said frame, one for each of said standards located in two groups intermediate said groups of standards with the members of each group of saddles in laterally spaced relationship and with each saddle in longitudinal alignment with its cooperating standard, means for supporting a plurality of airplane wing panels, one upon each of said standards and its cooperating saddle for limited yielding movement with respect to said frame during transportation and with each of said panels in overlapping nested relationship with respect to an adjacent panel carried by said frame and an attaching fixture on each standard for attachment and support of the panel adapted to be carried by the standard.

6. A rack for transporting airplane wing panels comprising a frame, a plurality of pairs of supporting members carried by said frame, each pair of said supporting members consisting of an upright standard located adjacent one end of said frame and a supporting saddle in which the edge of said wing panel is adapted to be seated located in spaced longitudinal alignment to said standard at a point intermediate the ends of said frame, a pivotal connection interposed between each of said wing panels, said frame and one of said upright sandards, and a yielding connection between said wing panel, said frame and the other of said supporting members adapted to support said wing panel for limited yielding movement relative to said frame during transportation.

7. A rack for transporting airplane wing panels comprising a frame, a plurality of pairs of supporting members carried by said frame arranged in staggered offset relation relative to each other, each of said pairs of members consisting of a supporting standard and a saddle in which the edge of said wing panel is adapted to be placed, a supporting fixture provided with means adapted for attaching it securely to one end of said wing panel and means for pivotally securing said fixture and wing panel to said standard upon a horizontal axis extending transversely of said frame, and said saddle being constructed of yielding textile material adapted to support said panel at a point intermediate its ends.

8. A rack for transporting airplane wing panels provided with apertured attachment lugs for securing the same in assembled position upon an airplane, said rack consisting of a supporting frame, a plurality of upright standards arranged in groups ajacent to each end of said frame and mounted thereto with the members of one group in laterally spaced relation to each other and in staggered horizontally offset relation to the members of the other group arranged at the opposite end of said frame, a plurality of supporting saddles mounted on said frame, one for each of said uprights, each of said saddles being in longitudinal alignment with its cooperating standard, an attachment fixture for each of said standards adapted for attachment to said wing panel lugs and means for detachably securing each of said attachment fixtures to one of said standards.

9. A rack for transporting airplane wing panels provided with apertured attachment lugs for securing the same in assembled position upon an airplane, said rack consisting of a supporting frame, a plurality of upright standards arranged in groups adjacent each end of said frame and mounted thereto with the members of one group in laterally spaced relation to each other and in staggered offset relation to the members of the other group arranged at the opposite end of said frame, a plurality of supporting saddles mounted on said frame, one for each of said uprights, with each of said saddles in longitudinal alignment with its cooperating standard, an attachment fixture for each of said standards adapted for attachment to wing panel lugs and means for detachably securing each of said attachment fixtures to one of said standards comprising a transverse horizontally extending shaft carried by said fixture and bearings carried by said standards in which said shaft is seated.

10. A rack for transporting airplane wing panels provided with apertured attachment lugs for securing the same in assembled position upon an airplane, said rack consisting of a supporting frame, a plurality of upright standards arranged in groups adjacent each end of said frame and mounted thereto with the members of one group in laterally spaced relation to each other and in staggered offset relation to the members of the other group arranged at the opposite end of said frame, a plurality of supporting saddles mounted on said frame, one for each of said uprights, each of said saddles being in longitudinal alignment with its cooperating standard, an attachment fixture for each of said standards adapted for attachment to wing panel lugs and means for detachably securing each of said attachment fixtures to one of said standards comprising a transverse horizontally extending shaft carried by said fixture, bearings carried by said standards in which said shaft is seated, and readily detachable means carried by said standard for preventing accidental displacement of said shaft from said bearing during transportation.

11. A rack for transporting airplane wing panels provided with apertured attachment lugs for securing the same in assembled position upon an airplane, said rack consisting of a supporting frame, a plurality of upright standards arranged in groups adjacent each end of said frame with the members of one group in laterally spaced relation to each other and in staggered offset relation to the members of the other group arranged at the opposite end of said frame, a plurality of supporting saddles mounted on said frame, one for each of said uprights, each of said saddles being in longitudinal alignment with its cooperating standard, an attachment fixture for each of staid standards adapted for attachment to wing panel lugs and means for detachably securing each of said attachment fixtures to one of said standards comprising an apertured bracket projecting from said standard for engagement with an apertured lug of said wing panel, a bolt adapted for clamping said lug to said bracket and yieldable resilient means interposed between said bolt, said apertured lug and said apertured bracket, whereby the wing panel is yieldingly supported in said rack.

12. A rack for transporting airplane wing panels provided with apertured attachment lugs for securing the same in assembled position upon an airplane, said rack consisting of a supporting frame, a plurality of upright standards arranged in groups adjacent each end of said frame and mounted thereto with the members of one group in laterally spaced relation to each other and in staggered offset relation to the members of the other group arranged at the opposite end of said frame, a plurality of supporting saddles, one for each of said uprights, each of said saddles being in longitudinal alignment with its cooperating standard, an attachment fixture for each of said standards adapted for attachment to wing panel lugs, means for detachably securing each of said attachment fixtures to one of said standards, and each of said saddles comprising a sling-like length of yielding textile material in which the edge of said wing panel is adapted to be supported.

CLARENCE C. STUART.

REFERENCES CITED

The following references are of record in the file of this patent:

UNITED STATES PATENTS

| Number | Name | Date |
|---|---|---|
| 556,789 | Walker | Mar. 24, 1896 |
| 1,605,126 | Maynard | Nov. 2, 1926 |
| 1,889,350 | Cohen-Venezian | Nov. 29, 1932 |
| 1,893,227 | Cohen-Venezian | Jan. 3, 1933 |
| 1,912,270 | Funk | May 30, 1933 |
| 2,301,895 | Loney et al. | Nov. 10, 1942 |
| 2,343,844 | Milburn et al. | Mar. 7, 1944 |